United States Patent [19]

DeWachter

[11] Patent Number: 4,875,786
[45] Date of Patent: Oct. 24, 1989

[54] SNAP-RING WITH PIN RELEASE SEAL
[75] Inventor: Gary DeWachter, Greenville, S.C.
[73] Assignee: Reliance Electric Company, Greenville, S.C.
[21] Appl. No.: 291,634
[22] Filed: Dec. 29, 1988
[51] Int. Cl.4 ............................................. F16C 33/78
[52] U.S. Cl. ..................................... 384/482; 384/477; 384/489; 384/903; 277/9.5
[58] Field of Search ............... 384/482, 477, 584, 489, 384/903; 277/9.5, 9

[56] References Cited
U.S. PATENT DOCUMENTS 4,592,666  6/1986  Jörnhagen ........................... 384/482
4,711,455 12/1987  Ditcher et al. ....................... 277/9.5
4,763,904  8/1988  Martinie ............................. 384/482

Primary Examiner—Lenard A. Footland
Attorney, Agent, or Firm—Dority & Manning

[57] ABSTRACT

A carrier ring member is disclosed for holding one or more sealing devices in sealing engagement between a shaft and a bearing block, and having a snap-ring for maintaining the carrier member within the block. The snap-ring is held in its flexed condition to permit insertion of the carrier member within the block by a pin releasably retained on the ring when flexed and releases the free ends when manually pulled out of the member allowing the ring to assume its normal unflexed condition.

7 Claims, 3 Drawing Sheets

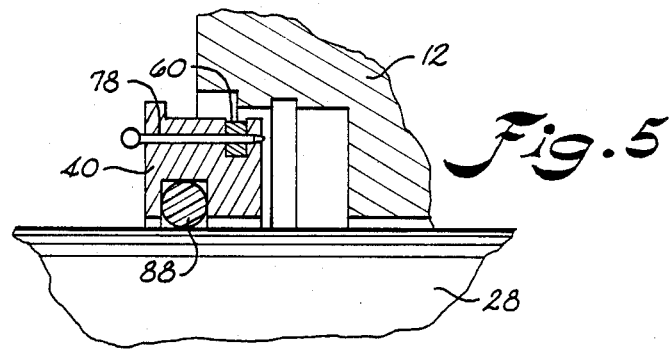
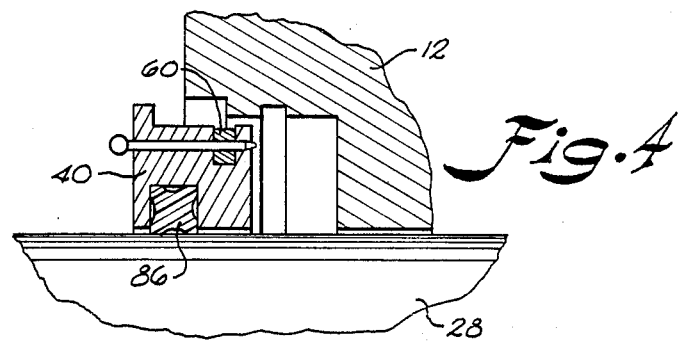
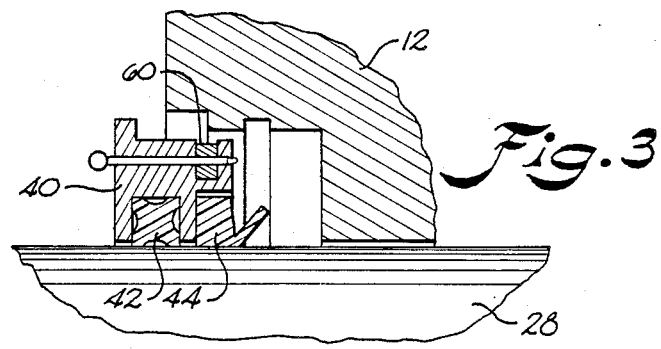

SNAP-RING WITH PIN RELEASE SEAL

BACKGROUND OF THE INVENTION

The invention relates generally to seal devices and, more particularly, to mechanisms for facilitating quick mounting of seal devices to host bearings.

In conventional shaft bearings such as pillow blocks and the like, it is common practice to seal bearings between the shaft and its supporting housing with any one of a number of different types of seal devices, such as labyrinth type seals, O-rings, quad-rings, V-rings, or flinger type, or any combination of the seals. An example of this practice is illustrated and described in U.S. patent application, Ser. No. 07/232,673, filed August 16, 1988, of which the present invention is an improvement.

In applying and mounting one or more seal devices in a bearing block, it is customary to utilize a seal carrier device to which the one or more seal devices are applied and to mount the carrier device and the seal devices with the shaft extending therethrough to the block or housing for the bearing. A snap-ring which is also retained within the carrier device is arranged around a groove therein and adapted to be retained within an annular groove formed in an internal cylindrical surface of the bearing block or housing. Such installation of the carrier device requires that the snap-ring be squeezed inwardly to permit slipping of the same into the cylindrical opening and then released to fit into the groove when it assumes its normal unflexed orientation.

In the past, such squeezing of the snap ring is performed by the operator by manually grasping the outer surface of the snap-ring and inserting the ring along with one or more sealing devices or combinations thereof into the internal chamber of the block housing. Such attempts are not always successful during the initial try requiring additional attempts in order to succeed in positively locating the snap-ring within an annular groove and allowing the same to expand to be retained within the groove. In some cases, a special tool is employed which is arranged to encircle the snap ring and with manipulation, to flex the snap ring internally and permit the application of the same into the bearing housing. The use of fingers for this operation generally results in bruised fingertips and expenditure of time as well as producing frustration and anger within the operator.

Another arrangement for squeezing a snap-ring into its flexed condition is disclosed in application Ser. No. 07/232,673, identified above. This arrangement comprises the use of an annular inclined surface which drives the snap-ring inwardly into its flexed condition as the seal carrier member is forced inwardly into a bearing block.

The present invention has been devised to obviate the disadvantages described above and permit quick and easy mounting of a snap-ring for a sealing device that is also economical in use and manufacture. In accomplishing these goals, means have been devised which will maintain a snap-ring in its inwardly flexed condition while mounted on the carrier ring as the same is inserted within the bearing housing to mount the sealing devices therein. The retaining means comprises a rod-like member or pin releasably held within an opening formed in the carrier member and extending axially relative thereto in engagement with the free ends of the snap-ring thereby holding the free ends in a fixed condition when the snap-ring is flexed inwardly. After the carrier member with the sealing devices mounted thereon and the snap-ring retained in its flexed condition are positioned within the bearing housing with the snap-ring opposite the annular groove formed for receiving the snap-ring, the pin is released or withdrawn from the opening in a carrier member. In this manner, the free ends of the snap-ring are released, thereby permitting the snap-ring to assume its normal unflexed condition within the annular groove.

Therefore it is a principal object of the present invention to improve shaft bearings of the type utilizing snap-rings to maintain sealing devices therein.

Another object of the present invention is to provide a method for mounting a snap-ring and sealing system within a bearing block which requires very simple manipulative steps to secure the same within.

These and other objects of the present invention will apparent after reading the following description taken in conjunction with the drawings wherein:

BRIEF DESCRIPTION OF THE DRAWINGS

FIG. 3 is an enlarged fragmentary cross-sectional view similar to FIG. 1a illustrating another position of the detail; and FIGS. 4 and 5 are fragmentary cross-sectional views similar to FIG. 3, but showing other types of sealing devices applicable with the present invention.

DESCRIPTION OF A PREFERRED EMBODIMENT

Figure 1:
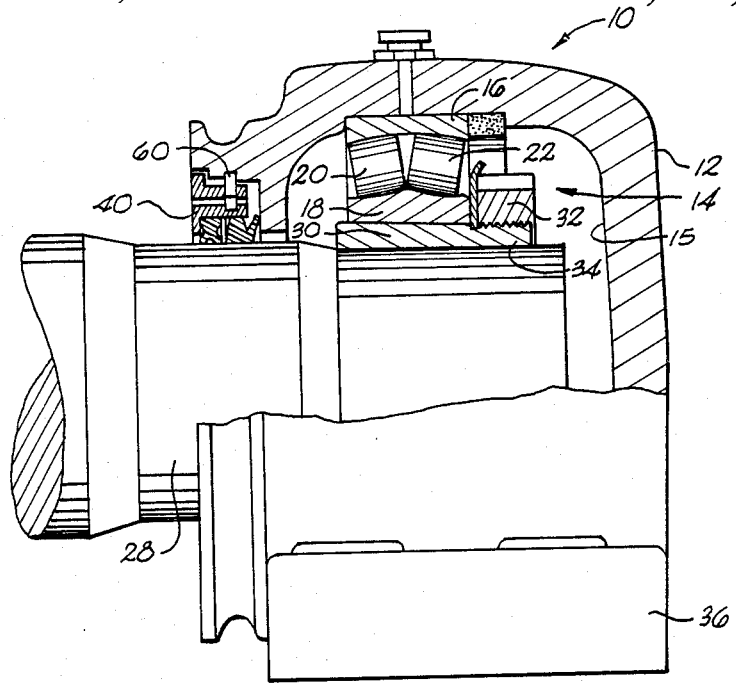
FIG. 1 is a cross-sectional view of a bearing block showing sealing devices in sealing engagement with a shaft supported for rotation within the block being held therein by a snap ring.
Figure 1A:
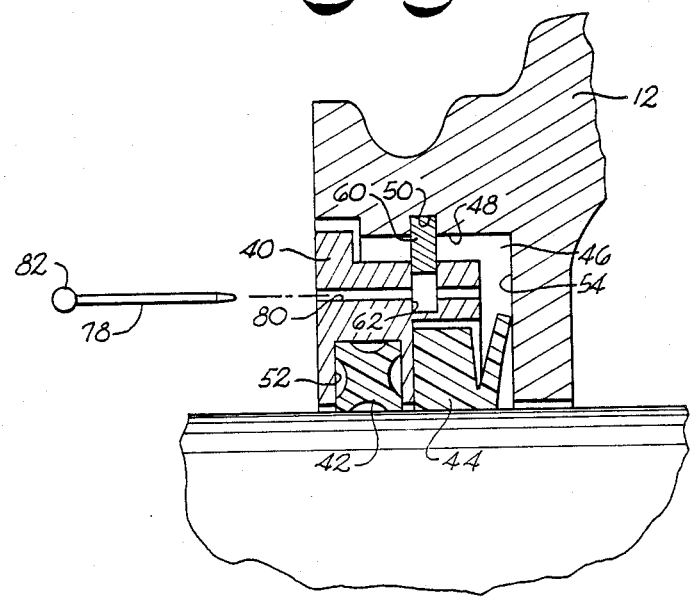
FIG. 1a is an enlarged fragmentary view of a detail and showing a V-type and quad-type sealing device related thereto.

Referring more specifically to the drawings and to FIG. 1 in particular, numeral 10 indicates generally a bearing block having a housing 12 and a bearing assembly 14 mounted in a chamber 15 of the block and supported within the housing. For purposes of the present invention, the bearing assembly may be considered as conventional consisting generally of an outer race 16, an inner race 18, and two rows of roller bearings 20 and 22 with the roller bearings being held in place between the outer and inner races by cages (not shown).

For illustration purposes, the bearing block 10 serves to support a shaft 28 for rotation therein. The shaft 28 extends through a tapered bearing sleeve 30 upon which the inner race 18 is securely fastened, and normally extends completely through the bearing sleeve beyond the planes of the inner and outer races 16, 18. The inner race 18 and consequently the entire bearing assembly 14 is retained firmly in place on the sleeve 30 by a lock nut 32 threadably secured upon a threaded exterior surface 34 of the sleeve 30. The housing 12 is provided with a base 36 containing suitable openings on either side thereof for securing the bearing block on a supporting structure. While the present invention is particularly adapted for use in large bearings such as a pillow block, the invention is applicable to various other types and sizes of bearings.

As will appear below, the sealing devices which may be employed in the sealing system utilized with the present invention, are disposed on one side of the bearing assembly 14 since the environment for the present invention is shown and described in relation to a pillow block, it will be understood that the sealing system of the present invention may be applied to opposite sides of the bearing assembly for other types and sizes of bearings.

As shown in FIG. 1, the shaft 28 is arranged in sealing engagement within the housing 12 by means of a seal carrier member or ring 40 which encircles the shaft and serves to hold a quad-ring seal 42 and a V-ring 44 thereagainst in sealing engagement. The carrier member 40 is retained within an opening 46 formed in the housing 12 and defined by a cylindrical wall 48 concentric with the axis of the shaft 28. The cylindrical wall 48, having a diameter slightly larger than the exterior diameter of the carrier member 40, is formed with a ring retaining groove 50.

Each of the seals 42, 44 are mounted for rotation with the shaft 28, the quad-ring seal 42 being retained in an annular groove 52 formed in the inner surface of the member 40 and the V-ring seal 44 being held between the inner end of the member 40 and an annular wall 54 formed in the housing 12 adjacent the cylindrical wall 48. The carrier member 40 is retained in the position shown in FIG. 1 by means of a snap-ring 60 mounted in a ring holding groove 62 formed in the outer surface of the carrier member. When mounted in the housing 12, the snap-ring 60 is in its unflexed condition and is retained within the groove 50. In this arrangement, the carrier member 40 and the seals 42, 44 are maintained in sealing engagement against the shaft 28 and within the bearing housing 12.

Figure 2:
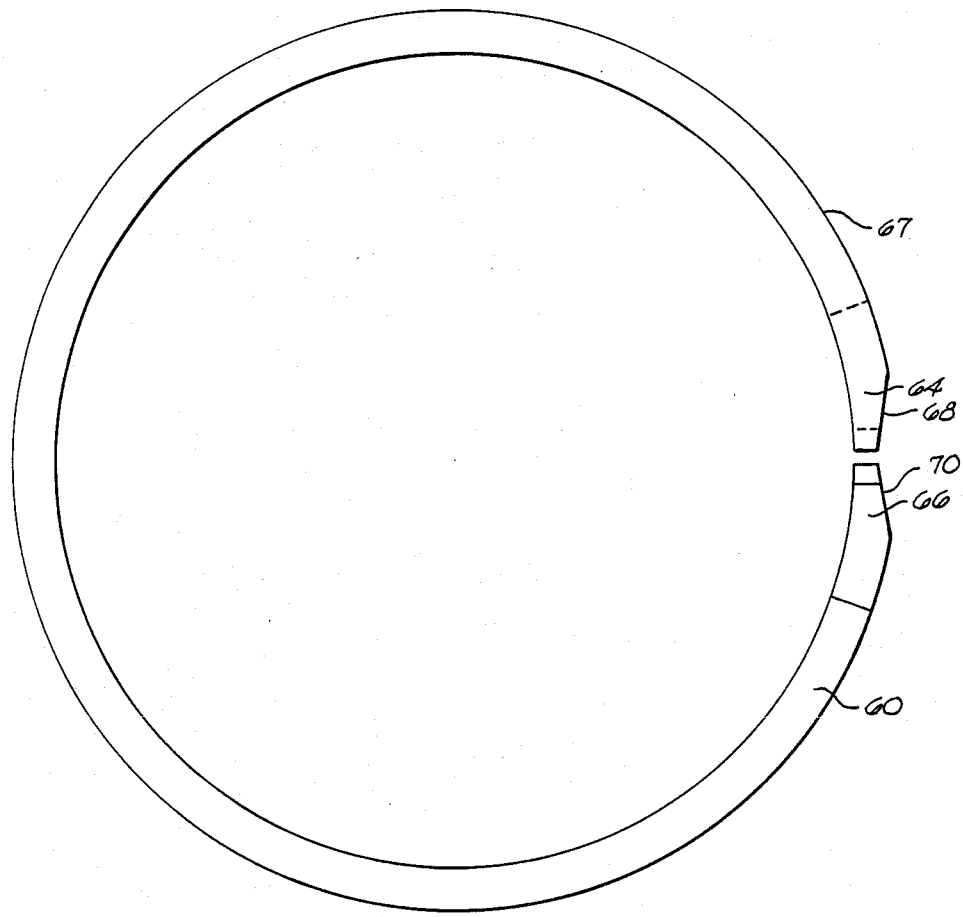
FIGS. 2 and 2a are plan and elevational views, respectively, of a typical snap-ring.
Figure 2A:
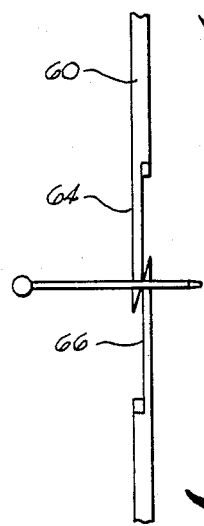
Figure 2B:
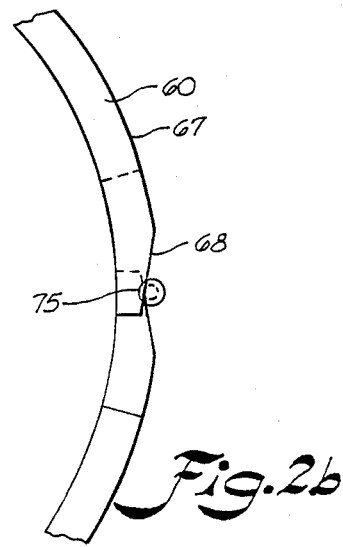
FIG. 2b is a fragmentary view of a part of the ring.

As shown in FIG. 2, 2a and 2b, the snap-ring 60 is of the conventional split-ring type having its free ends 64, 66 formed at a thickness half that of the ring itself and arranged to overlap when the snap ring is in flexed condition. The outer edges of the free ends 64, 66 which would normally assume the arc defined by the outer circumference 67 of the snap-ring are formed with straight surfaces 68, 70, respectively. When in its fully flexed condition as shown in FIG. 2b with the free ends 64, 66 in partial overlapping relationship, the surfaces 68, 70 cooperate to define a notch 75 within which a holding pin may be received to hold snap-ring 60 in the flexed position. While the snap-ring 60 is in its flexed condition within the groove 62 of carrier member 40, the same is held in this flexed condition by a pin 78 rigidly held from movement in a radial direction but detachable therefrom against the edges 68, 70 and within the notch 75. With the pin 78 held against lateral or radial movement, the snap-ring 60 is unable to assume its normal unflexed condition.

The pin 78 is releasably retained within a hole 80 formed in the carrier member 40 and has its outer end formed with a knob 82 to permit the operator to grasp this end of the pin and to remove the same out of engagement with the snap-ring 60. With the snap-ring held in its flexed condition and being held against radial movement because of the position of pin 78 within the hole 80 and with the carrier member 40 positioned within the opening 48 with the ring opposite the groove 50, removal of the pin 78 releases the free ends 64, 66 of the snap-ring for permitting the snap-ring to assume its unflexed condition. This assumption to its unflexed condition results in the snap-ring 60 entering the groove 50 for holding the carrier and consequently the sealing devices 42, 44 within the bearing housing 12 and in sealing engagement with the shaft 28 and the bearing housing.

In the embodiments of FIGS. 4, and 5, the carrier member 40 is shown with other combinations of sealing devices which may be carried by the carrier 40. In FIG. 4, a quad-type ring 86 is shown within the carrier 40 in sealing engagement with the shaft 28. In FIG. 5, the carrier member serves to retain an O-ring 88. These sealing devices and others, such as labyrinth type seals may be utilized singly, or in combination.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. In a sealing system for a bearing having a housing with an interior chamber therein for receiving a shaft to be sealed, a bearing assembly arranged within the chamber and having bearing elements extending radially relative to the shaft and supporting the same for rotation, the housing being formed with an opening having a cylindrical surface formed with an annular groove concentric with the axis of the shaft to be supported therein, the improvement comprising:

an annular sealing device arranged within the opening concentric with the cylindrical surface, an annular carrier member encircling the shaft adapted to be positioned within the opening for holding said sealing device in sealing position between the shaft and the bearing housing, said carrier member having a flexible snap-ring adapted to be flexed inwardly during positioning of said carrier member within the opening and to extend into the annular groove in the cylindrical surface when in its unflexed condition, and means mounted in said carrier member and engageable with snap-ring for holding the same in flexed condition during said positioning of said carrier member within the opening and to release said snap-ring after said carrier is within the opening to permit said snap-ring to assume its unflexed condition.

2. The sealing system defined in claim 1 wherein said holding means is a manually removable rod-like element mounted in said carrier member.

3. The sealing system defined in claim 2 wherein said rod-like element is releasably mounted in an opening formed in said carrier member.

4. The sealing system defined in claim 3 wherein said sealing device is an O-ring.

5. The sealing system defined in claim 3 wherein said sealing device is a quad-ring.

6. The sealing system defined in claim 3 wherein said sealing device is a V-ring.

7. The sealing system defined in claim 3 wherein said sealing device is a V-ring and an O-ring.

* * * * *